United States Patent [19]
Midling et al.

[11] Patent Number: 5,813,592
[45] Date of Patent: Sep. 29, 1998

[54] FRICTION STIR WELDING

[75] Inventors: Ole Terje Midling; Edward James Morley, both of Kopervik; Anders Sandvik, Skjold, all of Norway

[73] Assignee: The Welding Institute, Cambridge, England

[21] Appl. No.: 718,590

[22] PCT Filed: Jan. 5, 1995

[86] PCT No.: PCT/NO95/00005

§ 371 Date: Sep. 26, 1996

§ 102(e) Date: Sep. 26, 1996

[87] PCT Pub. No.: WO95/26254

PCT Pub. Date: Oct. 5, 1995

[30] Foreign Application Priority Data

Mar. 28, 1994 [NO] Norway ..................................... 941144
Jul. 27, 1994 [NO] Norway ..................................... 942790

[51] Int. Cl.$^6$ .................................................. B23K 20/12
[52] U.S. Cl. ...................... 228/112.1; 228/2.1; 156/73.5; 156/580
[58] Field of Search ................................ 228/112.1, 196, 228/2.1, 51, 55; 156/73.5, 580; 407/1, 119, 34; 409/182; 144/240, 241

[56] References Cited

U.S. PATENT DOCUMENTS

| | | | |
|---|---|---|---|
| 1,801,035 | 4/1931 | Carter | 144/241 |
| 3,949,896 | 4/1976 | Luc | 220/75 |
| 4,144,110 | 3/1979 | Luc | 156/73.5 |
| 4,260,094 | 4/1981 | Stroo | 228/112.1 |
| 4,593,734 | 6/1986 | Wallace | 407/34 |
| 5,460,317 | 10/1995 | Thomas et al. | 228/112.1 |

FOREIGN PATENT DOCUMENTS

| | | |
|---|---|---|
| 26 56 017 | 6/1978 | Germany . |
| 55-73490 | 6/1980 | Japan . |
| 001393567 | 5/1988 | U.S.S.R. . |
| 572 789 | 10/1945 | United Kingdom . |
| 1 567 135 | 5/1980 | United Kingdom . |
| WO93/10935 | 6/1993 | WIPO . |

OTHER PUBLICATIONS

Abstract, JP 57–149082, 1982.
Abstract, JP 61–176484, 1986.
P. Drews et al., "The Connecting of CrNi–Steel To Aluminum and AL Alloys by the friction Welding Process", Industrie–Anzeiger Schweiss–und Schneidtechnik, May 26, 1970, (in German).
S. Elliott et al., "Joining Aluminium To Steel—A review of Mechanisms And Techniques In Friction Welding And Diffusion Bonding", The Welding Institute, Jun., 1979 (pp. 1–26, and Figures).
88–203819/29, DNEPR Pipe Rolling Works, SU–1362–593A, Jun. '88, Derwent Publ.
89–199319/27, DNEPR Metal Inst, SU 1433–522A, Aug. 89, Derwent Publ.

*Primary Examiner*—Samuel M. Heinrich
*Attorney, Agent, or Firm*—Martin M. Novack

[57] ABSTRACT

The present invention relates to a method of friction welding for joining of members and more particularly to so-called friction stir welding based on a relative rubbing movement between a probe of harder material and members to be joined. The present invention also is directed to an improved tool to be applied in the friction welding process.

18 Claims, 3 Drawing Sheets

FRICTION STIR WELDING

The present invention relates to a method of friction welding for joining of (metal) members and more particularly to so-called friction stir welding based on a relative rubbing movement between a probe of harder material and members to be joined. The present invention also is directed to an improved tool to be applied in the friction welding process.

Friction welding based on the principle of "rubbing" of articles to be joined together so as to generate a sufficient amount of heat, thus generating plasticised conditions in the adjacent surfaces, has been known and practised for several decades. The frictional heat is generated solely by the two to be joined components. However, the resulting weld seams suffer from a number of disadvantages inherent in the applied processes. The main drawback which considerably limits the applicability of friction welding is that at least one of the components to be welded has to be axis-symmetric. Consequently, such process is not applicable for e.g. structural applications requesting provision of longitudinal continuous welds.

The improved version of this welding so-called friction stir welding, is known from WO93/10935. A probe (third body) of a narder material than the treated workpieces is applied in the welding process. Friction stir welding is based on a relative cyclic movement between the probe and the workpieces, urging the probe and workpieces together to create a plasticised region in the workpiece region due to generated frictional heat, stopping the relative cyclic movement and allowing the plasticised material to solidify. Thus no heat is generated due to a relative motion between the workpieces to be joined. The method is illustrated by several examples of different workpiece materials (plastics, metals), applications (reparation of cracks, sealing, joining) and embodiments of the applied probe.

Neither the above disclosed method and apparatus, when applied for joining of extruded shapes into structures for critical applications, can meet the request for high integrity welds free from voids and proper metallurgical bonding of structural parts, nor a demand for provision of welds in a lap configuration.

In order to achieve a proper consolidation of the weld metal the probe bottom part (shoulder) must maintain during the whole welding operation (forward movement) in an intimate contact with surface of the joined members. If the probe shoulder during this forward movement even temporarily "lifts" from the surface a small amount of plasticised welding material will be expelled behind the probe thus causing occurrence of voids in the-weld since there is no available material to fill the vacant space after the expelled material.

Furthermore there is another limitation connected to use of "smooth" welding probe known from the prior art, namely low welding speeds are required in order to achieve a sufficient frictional heating of the material (contact time between the probe and the joined members), and to ensure a sufficient flow of the plasticised welding material.

It is therefore an object of the present invention to provide an improved method of friction stir welding, ensuring high integrity welds free from voids and exhibiting a smooth quality surface.

A further object of the invention is to improve the present known friction stir butt welding method to provide also lap welds and three or more components joint configuration.

Another object of the present invention is to provide a new type of probe ensuring uniform homogenized weld seams exhibiting reduced heat affected zone.

The above and other objects are achieved in accordance with the present invention by provision of a method for friction stir welding and an apparatus (probe) as defined in the accompanying claims 1 and 7, respectively.

Other objects, specific features and advantages of the present invention will be apparent from the following detailed descriptions of preferred embodiments with reference to the accompanying drawings, FIGS. 1–5, where:

Figure 1:
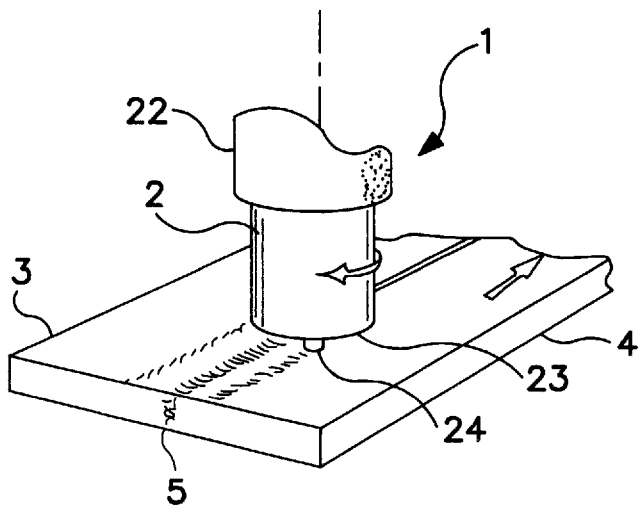
FIG. 1 is a schematic perspective view of the welding apparatus/process employable in the present invention.

Referring to the drawings, particularly to FIG. 1, a non-consumable probe 1 comprising a rotational cylindrical body 2 having an upper part 22 being connected to a power source, e.g. an engine (not shown in the drawing), and a bottom part 23 provided with a separate pin 24, is applied for joining (welding) of two butt to butt arranged members (metal plates) 3 and 4. By insertion of the probe 1 between the members 3,4 under pressure and rotation in order to provide adequate frictional heating a butt seam weld 5 is subsequently provided during a transitional movement along the butt arranged members.

Figure 2:
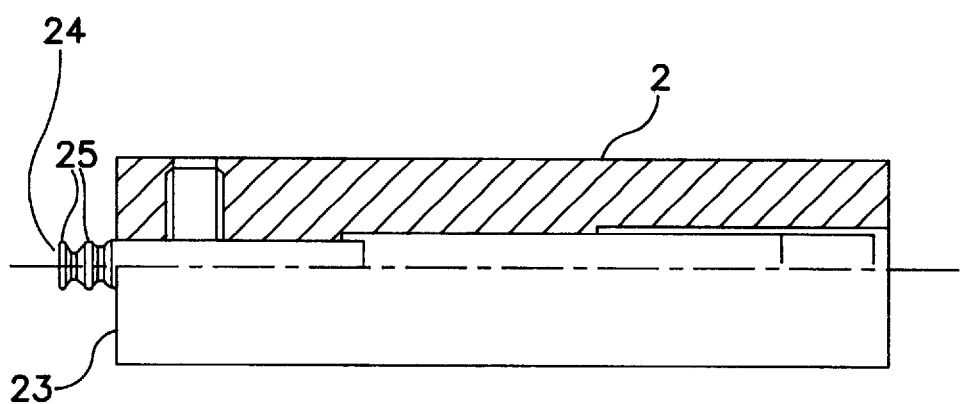
FIG. 2 illustrates in an enlarged cross-sectional (partial) view the configuration of the two components probe.

The special inventive configuration of the composite two parts probe 1, the bottom part 23 (shoulder) of the probe and outer shape (configuration) of the applied pin 24 according to the present invention is more apparent from FIG. 2, where the bottom part 23 of the rotational cylindrical body 2 exhibits a concave surface, while the pin's 24 outer surface is provided with alternately protruding and recessed parts along its longitudinal axis.

Even if a conventional screw thread on the outer pin surface is applicable and will improve the weld quality, in a preferred embodiment of the probe pin the surface configuration, as illustrated in the Figure, comprises advantageously two or more separate blades 25 vertically disposed and laterally protruding from the central portion of the pin.

Microstructure of welding seams provided by this novel type of the pin exhibits sound joints composed of interlocked plasticised segments of the joined members with minimal material turbulence.

The composite design of the applied probe 1 comprising a separate probe pin compared to the monolithic design of the previously known probes presents several advantages. Firstly, the tool (probe) is capable of adjustment of the depth of pin insertion, thus offering a process flexibility. Secondly, the pin portion can be easily interchanged between different tool units (shoulder/holder) and thus adapted for welding of members having various wall thickness.

Figure 3:
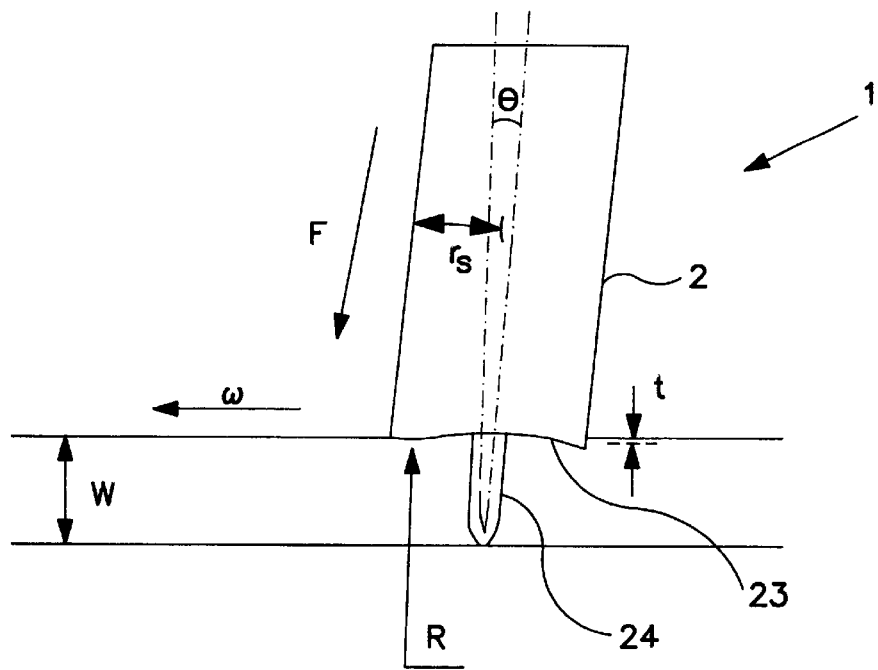
FIG. 3 shows schematically principal features of the novel friction stir welding.

The innovative features of the new tool and improved process of friction stir welding will be readily understood from the schematical sketch of the probe and welding performance as illustrated in FIG. 3, where W denominates the thickness of the welded members, $\omega$ welding speed, R radius of curvature of the concave probe shoulder, F downward force (pressure) applied on the probe, $r_s$ probe shoulder radius, and t represents "undercut" of the shoulder into the welded material.

The concave bottom surface 23 of the probe 1 exhibiting slight inclination in relation normal to the welding surfaces combined with the above described screw configuration of the pin 24 (not shown in the Figure) ensures that the plasticised material is driven both vertically and laterally in a weld zone, thereby transforming metal between different levels across the weld profile. The concave shape of the probe shoulder provides a certain non-symmetric compression on the surface of the members resulting in vertical flow/transition of material, This in co-operation with horizontal movement of material due to the pin's outer configuration results in high quality void free seams.

Figure 4:
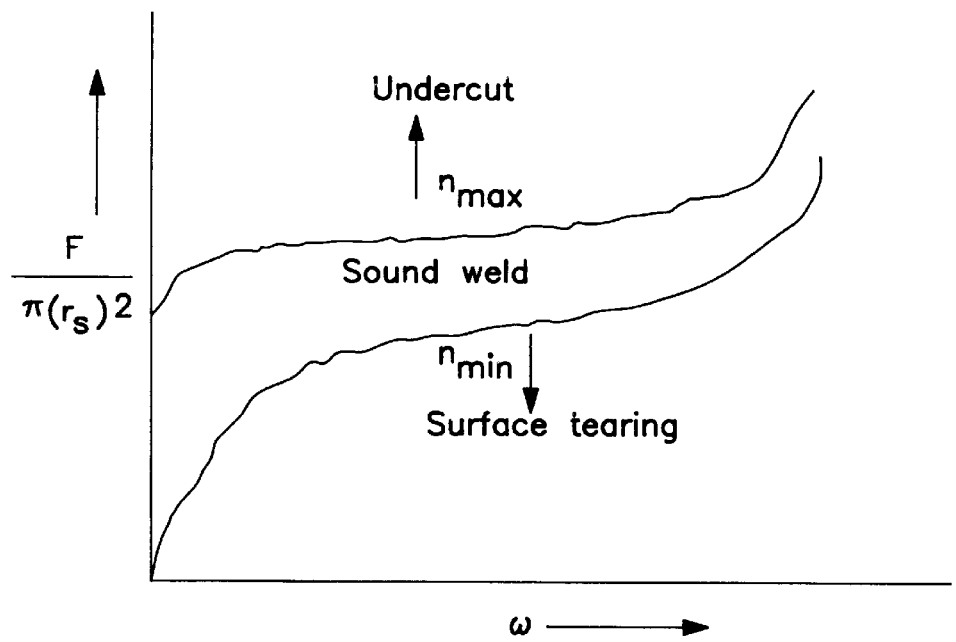
FIG. 4 shows graphically the optimal relation between welding and rotational speed and applied pressure on the probe, and FIGS. 5$a$–$e$ are fragmentary, schematic perspective views of different types of the provided weld seams.

FIG. 4 illustrates schematically an optimum relation between a downward pressure $F/\pi r_s^2$ in $N/mm^2$ applied on the probe and the actual welding speed $\omega$(mm/min) at different rotational speeds ensuring a sound void free weld having a smooth surface. The actual values of optimal pressure/welding speed are dependent on several factors, e.g. applied material of the joined members (Al-alloys), shoulder geometry etc.

Several welding trials conducted with probes of different diameters show that reduction of the probe shoulder's diameter related to the actual wall thickness of the joined members has a beneficial effect on the quality of the provided joints/seams besides possibility of increasing the welding speed.

Thus, reduction of the probe shoulder's diameter from 20 mm to 15 mm and further to 10 mm applied for joining of 3 mm thick flat extrusions of alloy 6082.50 allowed an increase of the welding speed from 0.3 m/min to 0.8 m/min achieving high quality porefree welds exhibiting reduced HAZ (heat affected zone). This is a combined result of decreased heat input and its focusing towards the vicinity of the formed seam allowing for increase of the welding speed and reduced downward force applied on the probe resulting in distortion free welded structures.

A simple formula defining an optimal relation between the radius of the probe shoulder ($r_s$) and the wall thickness of the welded members W will be:

$$5W/2 \geq r_s \geq W/2$$

The material of the probe is harder than the workpieces/members to be joined. Typically for application on aluminium (alloy) members the material should exhibit a good strength at elevated temperatures, e.g. hot work steel, high speed steel or cermet material can be applied.

Figures 5A, 5B:
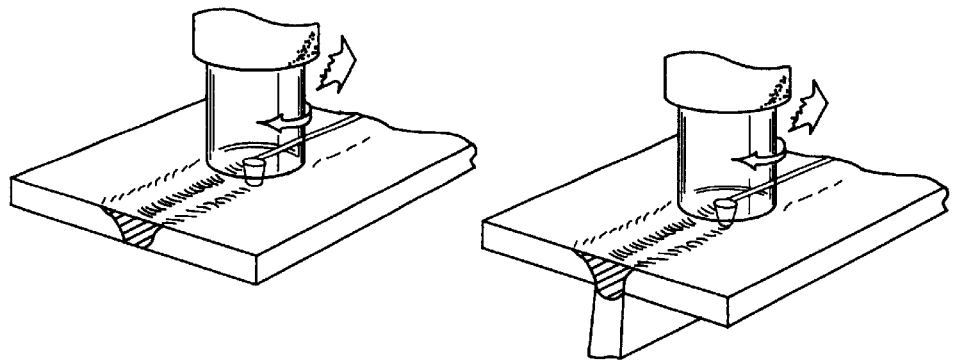
Figures 5C, 5D:
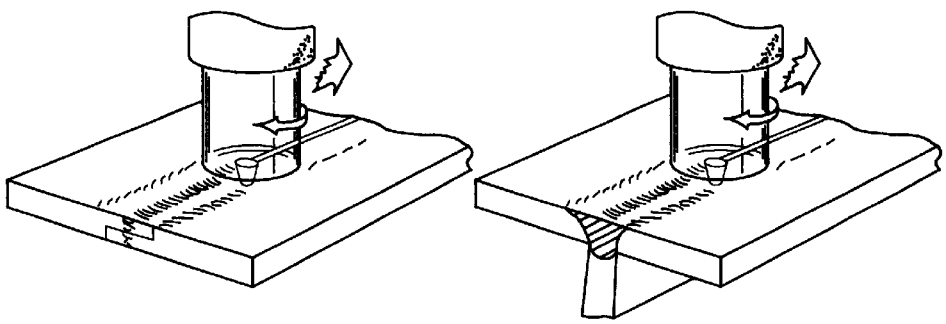
Figure 5E:
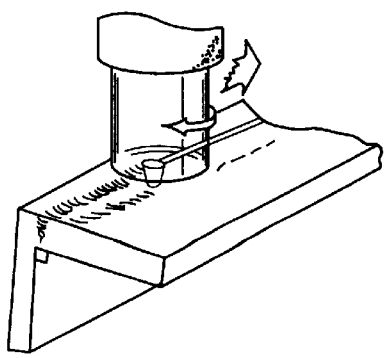

FIGS. 5a–e display schematically in fragmentary perspective views different types of welds provided by the method and probe according to the present invention, where FIG. 5a shows a conventional butt weld, FIG. 5b shows a T-section connection between two members, FIG. 5c is an overlap weld seam, FIG. 5d shows another variant of T-section composed of three members, and finally FIG. 5e illustrates provision of a corner weld between two members arranged in a normal plane to each other.

Thus application of the new and improved tool design according to the present invention allows for increased welding speeds while ensuring sufficient generation of frictional heat. This effect is achieved due to an extended contact/heating time per volume unit of the welding material and closer localization of the generated heat along the welding line. Further more substantial forging forces (pressure) are applied on the material when leaving the welding probe. Optimal combination of the above effects results in high quality welds both with regard to the metallurgical and mechanical properties due to a homogenized weld exhibiting no porosity through the whole weld cross-section.

We claim:

1. A method of friction stir welding of members, particularly for joining of extruded assembled shapes, comprising steps of urging and securing the assembled members towards each other, entering the assembled members along the joining line by a probe of material harder than the material of joined members under rotating movement which generates a frictional heat, thereby creating a plasticised region in the adjacent members' material, the method further comprising a homogenization of the resulting weld seam ensured by an enhanced flow of plasticised material both perpendicularly and vertically to the longitudinal extension of the adjacent assembled members by exposing the created plasticised material to a perpendicular pressure along the surface of the members and causing simultaneous material flow along the probe pin in the vertical direction allowing the plasticised material to solidify behind the probe.

2. Method according to claim 1, characterized in that the probe bottom part (23) engages the adjacent surfaces of the members to be joined under a slight inclination from normal to welding surfaces.

3. Method according to claim 1, characterized in that the probe pin's (24) outer configuration ensures a vertical and lateral flow of the plasticised material across a weld zone.

4. Method according to claim 1, characterized in that two or more members are welded providing a T-type welding joint.

5. Method according to claim 1, characterized in that the provided welded seam is a lap welding joint.

6. Method according to claim 1, characterized in that the provided weld seam is a corner weld connecting two members arranged substantially at any angle to each other.

7. A non-consumable probe (1) for stir friction welding of members comprising a rotational, substantially cylindrical body (2), having an upper part (22) connected to a power source and a bottom part (23) provided with a pin (24), characterized in that the bottom part (23) of the probe has a concave face and the attached pin (24) is an interchangeable part of the probe exhibiting a threaded surface configuration.

8. Probe according to claim 7, characterized in that the pin is provided with at least a pair of vertically disposed blades laterally protruding from the pin's central portion.

9. Method according to claim 2, characterized in that the probe pin's (24) outer configuration ensures a vertical and lateral flow of the plasticised material across a weld zone.

10. Method according to claim 2, characterized in that two or more members are welded providing a T-type welding joint.

11. Method according to claim 3, characterized in that two or more members are welded providing a T-type welding joint.

12. Method according to claim 9, characterized in that two or more members are welded providing a T-type welding joint.

13. Method according to claim 2, characterized in that the provided welded seam is a lap welding joint.

14. Method according to claim 3, characterized in that the provided welded seam is a lap welding joint.

15. Method according to claim 9, characterized in that the provided welded seam is a lap welding joint.

16. Method according to claim 2, characterized in that the provided weld seam is a corner weld connecting two members arranged substantially at any angle to each other.

17. Method according to claim 3, characterized in that the provided weld seam is a corner weld connecting two members arranged substantially at any angle to each other.

18. Method according to claim 9, characterized in that the provided weld seam is a corner weld connecting two members arranged substantially at any angle to each other.

* * * * *